2,763,352

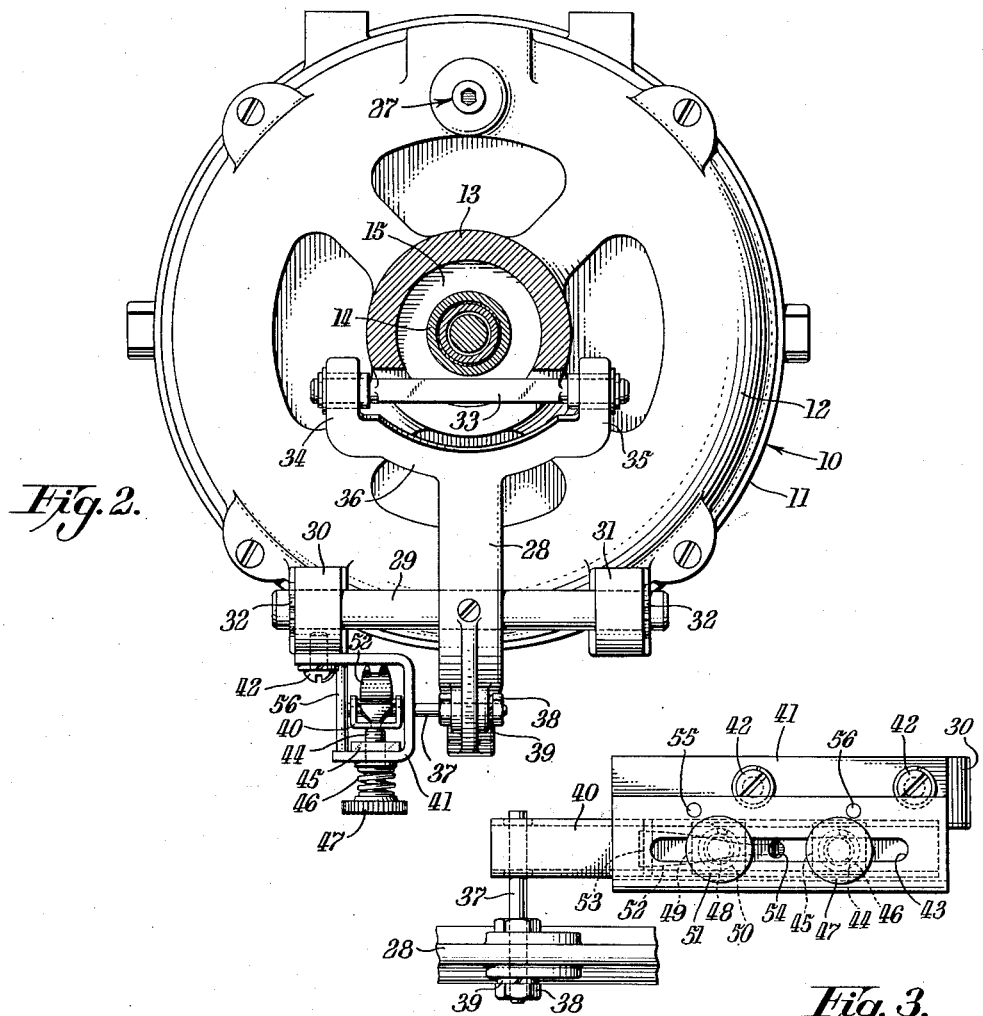

CLUTCH-BRAKE DRIVING MECHANISMS

Edgar P. Turner, Fanwood, N. J., assignor to The Singer Manufacturing Company, Elizabeth, N. J., a corporation of New Jersey Application May 1, 1952, Serial No. 285,505

3 Claims. (Cl. 192—18)

This invention relates to electric clutch-brake driving mechanisms or transmitters and more particularly to means for operating the clutch and brake mechanism.

An object of this invention is to provide clutch-brake driving devices with neutral positioning means to hold the clutch and brake mechanism yieldingly in a neutral position.

Another object of the invention is to provide a device whereby resistance to engagement of the transmitter clutch is increased as the clutch is moved into engagement.

A further object of the invention is to provide a device whereby the resistance to engagement of the transmitter brake is increased as the brake is moved into engagement.

In the drawings,

Fig. 2 is a view, in reduced scale, taken substantially on line 2—2 of Fig. 1.

Fig. 3 is a bottom view of the neutral positioning device.

Fig. 4 is a front view in elevation of the neutral positioning device adjusted to normally urge the transmitter brake into engagement.

Figure 1:
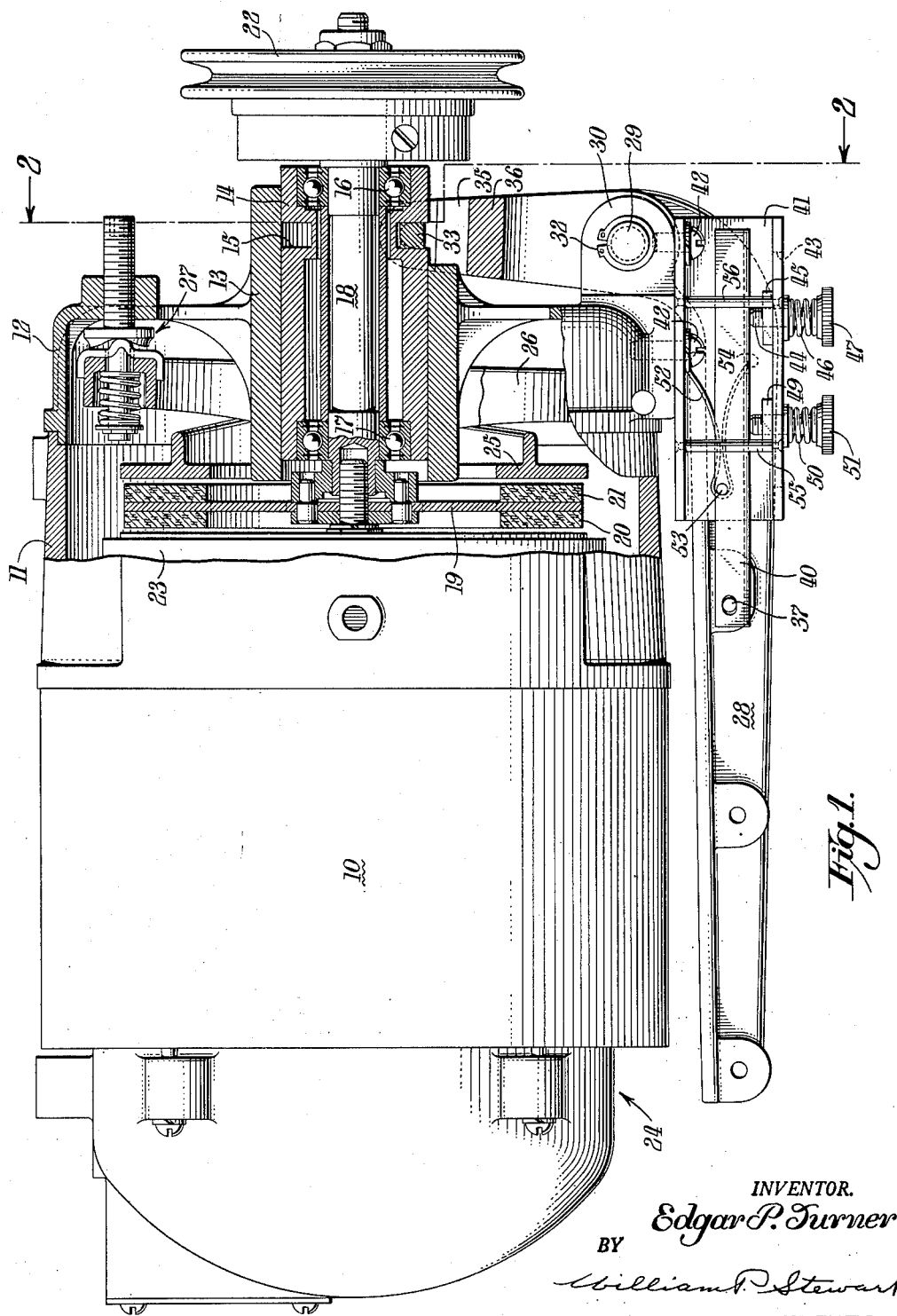
Fig. 1 is a front view, partly in section, of a clutch-brake driving device provided with my neutral positioning means.

Referring more specifically to the drawings, a transmitter 10 is shown, which may be similar in construction to the transmitter disclosed in the copending application, of E. P. Turner, Serial No. 285,504, filed on May 1, 1952. The transmitter 10 comprises a casing 11 closed at one end by an end cap 12 which is formed with a central support bearing 13. A control sleeve 14 is rotatably and slidably mounted in the bearing 13 and is formed with a circumferential groove 15 in its outer surface near one end. Two ball bearings 16 and 17 are carried by the sleeve 14 and rotatably support a driven shaft 18. A friction disc 19 is fastened to the inner end of the driven shaft 18 and carries a clutch ring 20 of friction material on one side and a brake ring 21 of friction material on the other side. A driven pulley 22 is fastened to the other end of the shaft 18. The clutch ring 20 is engageable with a rotatable driving element or flywheel 23 driven by an electric motor 24. The brake ring 21 is engageable with a brake element 25. The brake element 25 is supported by an adjusting lever 26 and adjusting mechanism 27 in a manner similar to that disclosed in said copending Turner application.

The clutch and brake mechanism is actuated by an actuating lever 28 fastened to a pivot pin 29. The pivot pin 29 is supported in bosses 30 and 31 formed on the end cap 12 and is restrained against axial motion relative to the bosses 30 and 31 by spring rings 32. A shifting pin 33 is carried by the arms 34 and 35 of a yoke 36 formed on one end of the lever 28 and passes through the groove 15 in the control sleeve 14 below the driven shaft 18, as shown in Fig. 1. The other end of the lever 28 can be attached to a suitable actuating mechanism, such as a foot treadle, not shown.

A horizontally extending stud 37 is fastened to the lever 28 by a nut 38 and a lock washer 39. A return lever 40 of U-shaped cross-section engages the stud 37 and extends substantially parallel to the lever 28. A C-shaped bracket 41 is fastened to the boss 30 by two screws 42. A slot 43 is provided in the bottom of the C-shaped bracket 41 which extends substantially the length of the bracket. An adjustable fulcrum screw 44 extends through the slot 43 and a large nut 45 to engage the return lever 40. A coil compression spring 46 encircles the threaded shank of the screw 44 and is disposed between a head 47 formed on the screw 44 and the bracket 41. The distance between the flats on the nut 45 is great enough that if the nut 45 tends to turn with the screw 44, the nut will engage the web of the bracket 41 and be restrained against turning. A second adjustable fulcrum screw 48 is also provided, which extends through the slot 43 and a nut 49 to engage the return lever 40. A spring 50 is disposed between the bracket 41 and a head 51 formed on the screw 48. A hairpin spring 52 is bent around a pin 53 carried by the walls of the return lever 40 and has one end entering a hole 54 provided in the web of the return lever 40. The other end of the spring 52 bears against the bracket 41 to urge the return lever toward the fulcrum screws 44 and 48. Two pins 55 and 56 are carried by the flanges of the bracket 41 and pass in front of the return lever 40, as viewed in Fig. 1, to hold the return lever in position.

From the above description, it is believed that the operation and advantages of my device will be readily understood. In devices of this type, it is often advantageous to have means provided which can be adjusted to hold either the clutch or the brake yieldingly in engagement or to hold both the clutch and the brake in a neutral position. When the fulcrum screws 44 and 48 are positioned in the slot 43 with the spring 52 engaging the return lever 40 between the screws 44 and 48, as shown in Fig. 1, the elements are positioned to hold the clutch and brake yieldingly in a neutral position. Adjusting the fulcrum screws 44 and 48 to vary the relative lengths of the screws 44 and 48 extending above the lower flange of the bracket 41 varies the clearances between the clutch elements 20 and 23 and the brake elements 21 and 25. As the fulcrum screw 44 is raised relative to the fulcrum screw 48, the return lever 40 pivots counterclockwise on the end of the fulcrum screw 48, as viewed in Fig. 1, and causes the actuating lever 28 to pivot counterclockwise about the pivot pin 29 to move the clutch element 20 closer to the flywheel 23. Of course, if the fulcrum screw 48 is raised relative to the fulcrum screw 44, the clearance between the clutch elements 20 and 23 is increased and the clearance between the brake elements 21 and 25 is reduced. The position of the fulcrum screws 44 and 48 in the slot 43 governs the amount of force which must be applied to the actuating lever 28 to engage the clutch or the brake. As the distance between the hole 54 in the return lever 40 and the pivot screws 44 and 48 is increased, the effective lever or torque arm of the spring 52 is increased, resulting in a greater force being required to operate the clutch or brake. Very accurate adjustment of the relative clearances of the clutch and brake is possible with this device and further the torque applied by the spring 52 to hold the clutch and brake in a neutral position can be varied over a wide range.

If it is desired to operate the transmitter 10 with the brake elements 21 and 25 normally urged into engagement, the pivot screws 44 and 48 are both moved along the slot 43 to the same side of the hole 54 in the return lever 41, as shown in Fig. 4. With screws 44 and 48 in this position, the pivot screw 44 serves as a primary fulcrum for the return lever 41 about which the lever 40 pivots under the force exerted by the spring 52 to urge the brake elements 21 and 25 into engagement. Adjustment of the fulcrum screw 44 along the slot 43 varies the length of the spring torque arm as described above and adjustment of the screw 44 through the bottom flange of the bracket 41 varies the deformation of the spring 52 and thus varies the force applied by the spring to urge the brake into engagement. With the screws arranged in this position, the pivot screw 44 can be adjusted to a height relative to the screw 48 where the return lever 40 engages the screw 48 after the actuating lever 28 is moved a predetermined distance to engage the clutch. The screw 48 forms a secondary fulcrum for the return lever 40 and provides a longer effective torque arm for the spring 52. The lever 40 can be moved a short distance by a small force applied to the lever 28 to move the clutch element 20 toward engagement with the flywheel 23 but when the return lever 40 engages the fulcrum screw 48, continued movement of the lever 28 causes the return lever to pivot about the screw 48. A greater force is required to continue movement of the lever 28 since the effective torque arm for the spring 52 is longer. This type of adjustment is advantageous where it is desired to have the brake elements 21 and 25 normally held in engagement and the clutch elements 20 and 23 engageable against increasing resistance. For example, the fulcrum screw 44 can be adjusted to permit the clutch elements 20 and 23 to be moved into slipping engagement by a small force applied to the lever 28 before the return lever contacts the screw 48. If firm engagement of the clutch elements 20 and 23 is desired, an operator must apply a noticeably greater force to the lever 28. The required increase in force to firmly engage the clutch elements 20 and 23 can be readily detected by an operator and aids him in determining when the clutch is engaged only sufficiently to transmit some power to the driven shaft 18 at a reduced speed as a result of slippage between the clutch elements 20 and 23. It is readily apparent that a similar type of operation is obtained with a normally engaged clutch upon moving both of the fulcrum screws 44 and 48 to the opposite side of the hole 54 from that in which they are shown in Fig. 4.

In view of the above description, it is readily apparent that I have provided a neutral positioning device for an electric clutch-brake driving device which can be adjusted to provide for a wide variety of desired operating conditions. Further, the neutral positioner is simple in construction and can be readily adjusted without disassembly or interchange of parts.

Having thus set forth the nature of the invention, what I claim herein is:

1. An electric clutch-brake driving device comprising a housing, an electric motor carried by said housing, a driving clutch element driven by said motor and a brake element within said housing, a driven member disposed between and engageable with said elements, means for moving said member into engagement with said elements including an actuating lever, a bracket carried by said housing, a return lever operatively connected to said actuating lever, adjustable fulcrum screws carried by said bracket and engageable by said return lever, and a return spring engaging said return lever and urging said return lever into engagement with said fulcrum screws.

2. A clutch-brake driving device comprising a driving clutch element, a brake element, a driven member disposed between and engageable with said elements, an actuating lever adapted to move said member into engagement with said elements, a return lever operatively connected to said actuating lever, a return spring engaging said return lever, and adjustable fulcrum means for said return lever operable to vary the effective lever arm of said return lever upon predetermined movement of said actuating lever.

3. A clutch-brake driving device comprising a driving clutch element, a brake element, a driven member disposed between and engageable with said elements, an actuating lever adapted to move said member into engagement with said elements, a return lever operatively connected to said actuating lever, a return spring engaging said return lever, and a plurality of fulcrums for said return lever, each of said fulcrums being effective at different positions of said actuating lever.

References Cited in the file of this patent
UNITED STATES PATENTS

| | | |
|---|---|---|
| 1,544,080 | Voight | June 30, 1925 |
| 1,552,368 | Whitacre | Sept. 1, 1925 |
| 1,646,643 | Dorsey | Oct. 25, 1927 |
| 1,662,566 | Dohle | Mar. 13, 1928 |
| 1,773,895 | Van Riper et al. | Aug. 26, 1930 |
| 1,911,223 | D'Aleo | May 30, 1933 |
| 2,609,075 | Schulder | Sept. 2, 1952 |
| 2,619,207 | Smith | Nov. 25, 1952 |